United States Patent
Frenger et al.

(10) Patent No.: US 8,824,306 B2
(45) Date of Patent: Sep. 2, 2014

(54) DETERMINING PREAMBLE SEQUENCES FOR RANDOM ACCESS

(75) Inventors: Pal Frenger, Linkoping (SE); Fredrik Gunnarsson, Linkoping (SE); Johan Moe, Mantorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 503 days.

(21) Appl. No.: 13/002,096

(22) PCT Filed: Jul. 3, 2008

(86) PCT No.: PCT/SE2008/050828
§ 371 (c)(1),
(2), (4) Date: Dec. 30, 2010

(87) PCT Pub. No.: WO2010/002303
PCT Pub. Date: Jan. 7, 2010

(65) Prior Publication Data
US 2011/0158104 A1    Jun. 30, 2011

(51) Int. Cl.
*H04L 12/26*    (2006.01)
*H04J 3/00*    (2006.01)
*H04B 7/208*    (2006.01)
*H04W 24/00*    (2009.01)
*H04W 72/00*    (2009.01)

(52) U.S. Cl.
USPC ........... 370/241; 370/336; 370/344; 455/423; 455/450

(58) Field of Classification Search
USPC .................. 370/241, 336, 344; 455/423, 450
See application file for complete search history.

(56) References Cited

U.S. PATENT DOCUMENTS

| | | | |
|---|---|---|---|
| 6,535,547 B1 * | 3/2003 | Lyckegård et al. | 375/145 |
| 2006/0018336 A1 * | 1/2006 | Sutivong et al. | 370/437 |
| 2008/0075043 A1 * | 3/2008 | Wang et al. | 370/330 |
| 2008/0101306 A1 * | 5/2008 | Bertrand et al. | 370/336 |

FOREIGN PATENT DOCUMENTS

| | | |
|---|---|---|
| WO | 0076248 A1 | 12/2000 |
| WO | 0111823 A2 | 2/2001 |
| WO | 2008/020624 A1 | 2/2008 |

OTHER PUBLICATIONS

Japanese Office Action from Apn. No. JP2011-516206, Mailing date Aug. 3, 2012, 2 pages.
3GPP TSG RAN WG1 Meeting #49, "RACH sequence allocation and indication to the cell" R1-072079, Kobe, Japan, May 7-11, 2007, pp. 1-7.
Notice of Allowance issued on Nov. 16, 2012 in corresponding Japanese application No. 2011-516206, 4 pages.

* cited by examiner

*Primary Examiner* — Xavier Szewai Wong
*Assistant Examiner* — Natali N Pascual Peguero
(74) *Attorney, Agent, or Firm* — Rothwell, Figg, Ernst & Manbeck, P.C.

(57) ABSTRACT

The present invention relates to a method and a communication network node for enabling auto-tuning of preamble sequences used during random access procedures when user equipments (18) are accessing a communication network system comprising radio base stations (15) each serving at least one cell (19) and with which said user equipments (18) are communicating on uplink (13) and downlink (12) channels. An initial set of RACH preamble sequences in one cell of a radio base station (15) and statistics on RACH usage and information on identified RACH preamble sequences potentially conflicting between neighbors of said radio base station (15) is collected. The collected statistics is used for optimizing said set of RACH preamble sequences, whereby the initial set of RACH preamble sequences is replaced with the optimized set of RACH preamble sequences.

24 Claims, 8 Drawing Sheets

(Prior Art)

Fig. 4

(Prior Art)

DETERMINING PREAMBLE SEQUENCES FOR RANDOM ACCESS

CROSS-REFERENCE TO RELATED APPLICATION

This application is a 35 U.S.C. §371 National Phase Entry Application from PCT/SE2008/050828, filed Jul. 3, 2008, and designating the United States.

TECHNICAL FIELD

The present invention relates to a method and a communication network node in a communication network system and, more particular, to a communication network node allowing for enabling auto-tuning of parameters used during random access procedures as well as a method for such enablement.

BACKGROUND

The demand for wireless data services, such as text messaging (SMS), multi-media messaging (MMS), mobile video and IPTV, demanding higher bandwidth is growing quickly. The third generation partnership project (3GPP) is developing the third generation mobile systems based on evolved GSM core networks and the radio access technology UMTS terrestrial radio access (UTRA) and has come up with a new orthogonal frequency division multiple access (OFDMA) based technology through the long term evolution (LTE) work which provides a very efficient wireless solution. The OFDMA based air interface is often referred to as the evolved UMTS terrestrial radio access network (E-UTRAN).

During initial access, the UE seeks access to the network in order to register and commence services. The random access (RA) serves as an uplink control procedure to enable the UE to access the network. Since the initial access attempt cannot be scheduled by the network, the RA procedure is by definition contention based. Collisions may occur and an appropriate contention-resolution scheme needs to be implemented.

Including user data on the contention-based uplink is typically not spectrally efficient due to the need for guard periods and retransmissions. Therefore, for LTE it has been decided to separate the transmission of the random access burst (preamble), whose purpose is to obtain uplink synchronization, from the transmission of user data.

The LTE RA procedure serves two main purposes:
It lets the UE align its UL timing to that expected by the eNode B in order to minimize interfering with other UEs transmissions. UL time alignment is a requirement in E-UTRAN before data transmissions may commence.
It provides means for the UE to notify the network of its presence and enables the eNode B to give the UE initial access to the system.

In addition to the usage during initial access, the RA will also be used when the UE has lost the uplink synchronization or when the UE is in an idle or a low-power mode.

Figure 2:
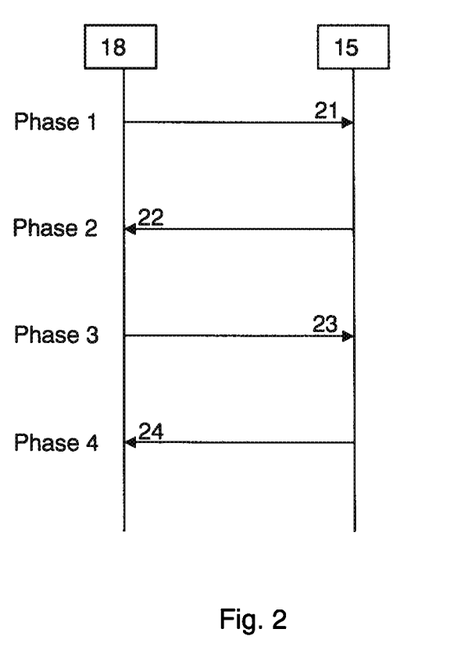
FIG. 2 illustrates a random access procedure in case of initial access.

The basic RA procedure is a four-phase procedure, as outlined in FIG. 2, and is as follows:
In phase 1, the UE 18 transmits a random access preamble (step 21), allowing the Node B 15 to estimate the transmission timing of the UE. Uplink synchronization is necessary as the UE otherwise cannot transmit any uplink data;
In phase 2, the network transmitting a timing advance command to correct the uplink timing, based on the timing of arrival measurement in the first step. In addition to establishing uplink synchronization, phase 2 also assigns uplink resources and temporary identifier to the UE to be used in phase 3 of the random access procedure;
Phase 3, consists of signalling from the UE 18 to the network using the UL-SCH similar to normal scheduled data. A primary function of this message is to uniquely identify the UE 18. The exact content of this signalling depends on the state of the UE 18, e.g., whether it is previously known to the network or not;
The final phase (phase 4), is responsible for contention resolution in case multiple UEs tried to access the system on the same resource.

For cases where the network knows, in advance, that a particular UE will perform a Random Access Procedure to acquire uplink synchronization, a contention-free variety of the Random Access Procedure has been agreed. This effectively makes it possible to skip the Contention Resolution process of Phases 3 and 4 for important cases such as arrival to target cell at handover (HO) and arrival of DL data.

Phase 1—Random Access Preamble

Prior to sending a preamble, the UE shall synchronize to the downlink transmissions and read the Broadcast Control Channel (BCCH). The BCCH will reveal where the RA time slots are located, which frequency bands may be used and which preambles (sequences) are available.

At the next RA slot, the UE will send the preamble. The preamble sequence implicitly includes a random ID which identifies the UE. LTE provides for each cell 64 such random IDs and thus 64 preambles.

If multiple RA frequency bands have been defined, the UE randomly selects one of them. The group of sequences allocated to a cell is partitioned into two subgroups. By selecting a preamble sequence from a specific subgroup, the UE can give a single-bit indication of its resource requirement and/or link quality. The particular sequence used for the preamble is randomly selected within the desired subgroup. This sequence implicitly contains a random ID which serves as a UE identifier.

The eNode B estimates the UL timing of the UE based on the timing of the received preamble.

Phase 2—Random Access Response

After the preamble transmission, the UE waits for a RA Response message on the DL-SCH, the DL assignment which is indicated on the L1/L2 control channel (DPCCH). The RA Response message is transmitted semi-synchronously (i.e. within a window) to the reception of the RA Preamble in order to allow the scheduler more flexibility. The RA Response contains:
the same random UE identity as present in the preamble;
a time alignment message to provide the proper uplink timing to the UE;
a temporary Radio Network Temporary Identifier (RNTI) which is unique for the particular RA resource (time, channel and preamble) used in Phase 1. For initial access, the temporary RNTI shall be used for Phases 3 and 4;
an UL resource grant for transmission on UL-SCH in Phase 3.

If no RA Response message has been received after a certain time (TBD) following the preamble transmission, the UE shall send a new preamble at the next RA time slot. It shall select new, random parameters for the preamble sequence and the non-synchronized RA frequency band. Furthermore, the UE will increase the power level of the preamble to obtain a power ramping procedure similar as used in WCDMA.

Phase 3—First Scheduled UL Transmission

In Phase 3, the UE provides the network with a unique identifier in the message it transmits on UL-SCH according to the grant contained in the RA Response. The type of UE identifier, e.g. C-RNTI, TMSI, IMSI or IMEI, depends on to which extent the UE is already known in the network.

In case of initial access, the message is an RRC Connection Request message. In case of non-initial access, i.e. when the UE is already RRC_CONNECTED, the UE identifier is the C-RNTI and is signalled by the MAC layer. The transmission uses HARQ.

Phase 4—Contention Resolution

The purpose of the fourth phase is to resolve contention. Note that, from the second step, multiple UEs performing simultaneously random access attempts using the same preamble listen to the same response message and therefore have the same temporary identifier. Hence, in the fourth phase, the eNode B echoes the UE identity provided by the UE in Phase 3. Only a terminal which finds a match between the identity received in the fourth step and the identity transmitted as part of the third step will declare the random access procedure successful. This terminal will also transmit a hybrid ARQ acknowledge in the uplink. For non-initial access, i.e. when the UE is already RRC_CONNECTED, the UE identity is reflected on the L1/L2 control channel. If the UE has not yet been assigned a C-RNTI, the temporary identity from the second step is promoted to the C-RNTI, otherwise the UE keeps its already assigned C-RNTI.

Terminals which do not find a match between the identity received in Phase 4 and the respective identity transmitted as part of Phase 3 are considered to have failed the random access procedure and need to restart the random access procedure with Phase 1; selecting new random parameters for the preamble sequence and the RA frequency band. No hybrid ARQ feedback is transmitted from these terminals.

Contention-Free Random Access Procedure

For cases where the network knows, in advance, that a particular UE will perform a Random Access Procedure to acquire uplink synchronization, a dedicated preamble is reserved and assigned to the UE under consideration. Dedicated Preamble assignment for HO is handled by RRC whereas preamble assignment for DL data arrival is handled by MAC. When the UE transmits the dedicated preamble in Phase 1, the network knows to which UE this preamble was assigned and can already at the time of detection of this preamble determine the identity of the UE. Thus no contention resolution is needed and the delay before data transmission can be resumed is reduced.

Random Access Back-Off Procedure

For the event of Random Access overload, a Random Access Back-Off procedure is supported. This procedure prevents immediate new Random Access attempts which would only worsen a collision situation.

Note: whether back-off shall be applied to the first preamble transmission attempt within a Random Access Procedure is FFS in 3GPP, as is the mechanism with which back-off is controlled back-off parameters signalled.

Random Access Channel Physical Resource

Figure 3:
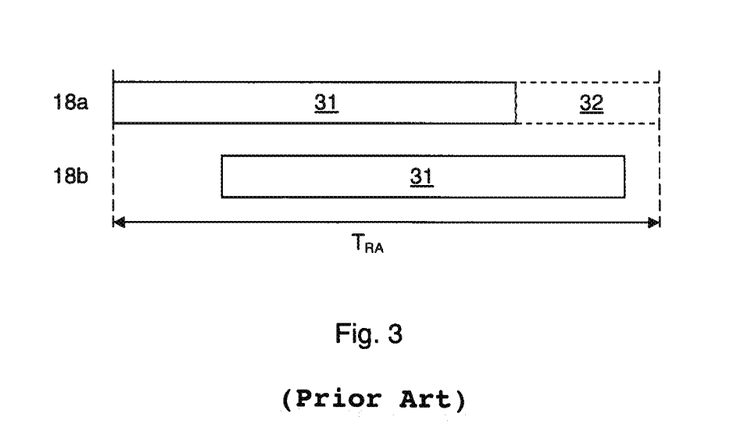
FIG. 3 shows an access burst timing for two user equipments.

A single RA opportunity consists of a time slot and a fixed bandwidth. The RA time slot length $T_{RA}$ shall accommodate the preamble sent by the UE and the required guard period (GP) to take into account the unknown uplink timing. FIG. 3 shows the access burst timing for two UEs 18a and 18b where the preamble is denoted 31 and the guard period (GP) is denoted 32. The timing misalignment amounts to 6.7 μs/km. 3GPP has decided for a minimum $T_{RA}$ of 1 ms. Here the preamble length is then 800 μs plus a cyclic prefix of around 102.5 μs. A guard time of 97.5 μs suffices for cell radii up to 15 km. Larger guard periods and cyclic prefix are needed to accommodate timing uncertainties from cells larger than 15 km. Such large cells may also require longer preambles to increase the received energy. In order to support RA under various cell conditions RAN1 has defined additionally 3 RA preamble formats which require a $T_{RA}$ of 2 ms or even 3 ms. These larger slots are created by the eNode B by not scheduling traffic in the consecutive sub-frame(s). Those extended preambles contain repetitions of the 800 μs long part and/or a longer cyclic prefix.

For TDD an additional "short" RA is defined. The short RA preamble only spans 133 μs. Because of this very short duration the preamble will most likely not contain a cyclic prefix but a technique called overlap-and-add will be used to enable frequency-domain processing. At the time of writing many details regarding applicability and performance of this short RA are still open.

According to 3GPP, the bandwidth of a RA opportunity is 1.08 MHz (6RB). The effective bandwidth utilized by the RA preamble is 1.05 MHz leaving small spectral guard bands on each side. This is necessary since RA and regular uplink data are separated in frequency-domain but are not completely orthogonal.

For FDD systems, RA opportunities do not occur simultaneously in different frequency bands but are separated in time. This spreads out processing load in the RA receiver. 3GPP defines RA configurations determining how often RA opportunities occur. In total 16 such configurations are defined, ranging from one RA opportunity every 20 ms (very low RA load) to one every 1 ms (very high RA load).

In TDD not all sub-frames are DL sub-frames reducing sub-frames that can be allocated to RA. To provide also in TDD configurations for high RA loads multiple RA opportunities can be scheduled in a single sub-frame.

In order to compensate for the rather low frequency diversity obtained within 1.05 MHz the RA opportunity hops in frequency-domain. No final decision has been made on the frequency hopping period, currently 10 ms and 40 ms are considered. For FDD RA opportunities are restricted to the outermost 6 RBs of the physical uplink shared channel at each band edge.

Figure 4:
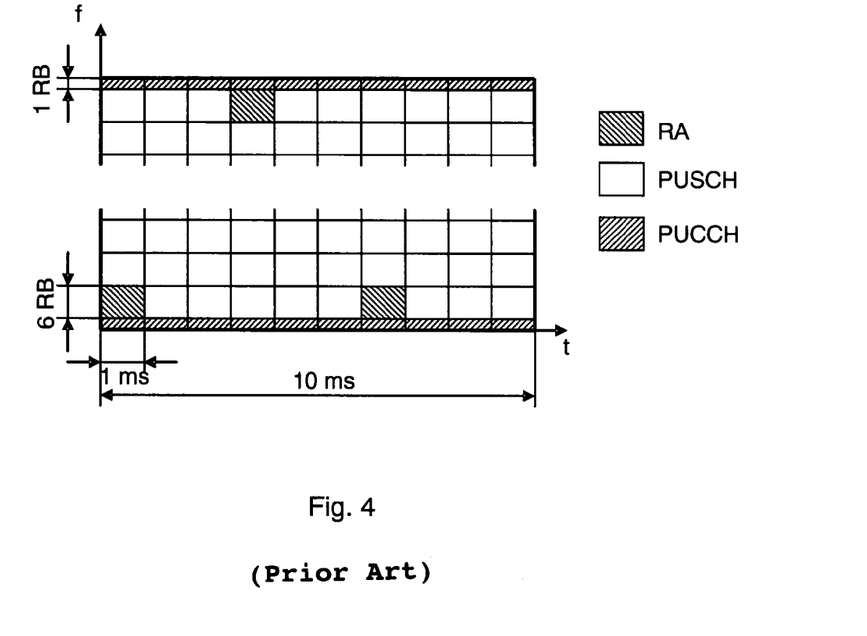
FIG. 4 shows the time-frequency structure of non-synchronized RA for FDD.

The TDMA/FDMA structure of the RA opportunities in FDD is visualized in FIG. 4 where the time and frequency configuration of the PRACH, PUSCH, and PUCCH in the LTE uplink is shown. In this example, three RA opportunities with 1 ms length exist in each frame. Here only one 1.08 MHz band is allocated to RA at each time whereas several bands are possible in case of TDD. The RA opportunities always occur at the band edges of the physical uplink shared channel directly adjacent to the physical uplink control channel.

Preamble Format

Figure 5A:
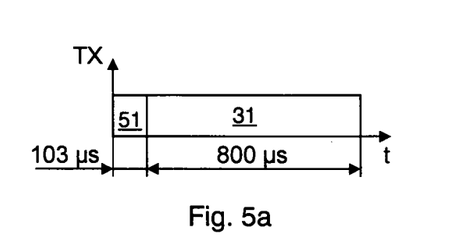
FIG. 5a shows the random-access preambles defined by 3GPP according to a first format.

FIG. 5a shows the detailed timing of the basic random-access preamble 31. The preamble 31 is prefixed with a cyclic prefix (CP) 51 to enable simple frequency domain processing. Its length is in the order of $T_{GP}+T_{DS}=97.5+5$ μs=102.5 μs, where $T_{DS}$ corresponds to the maximum delay spread and $T_{GP}$ corresponds to the maximum round trip time. The CP 51 insures that the received signal is always circular (after removing the CP in the RA receiver), and thus can be processed by FFTs. Therefore, the "active" random-access preamble duration is 1000 μs−2·$T_{GP}$−$T_{DS}$=800 μs. The RA sub-carrier spacing is ⅛₀₀ μs=1250 Hz.

Figure 5B:
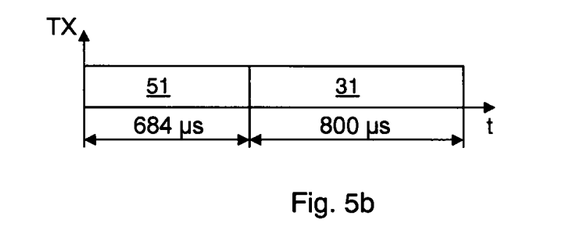
FIG. 5b shows the random-access preambles defined by 3GPP according to a second format.
Figure 5C:
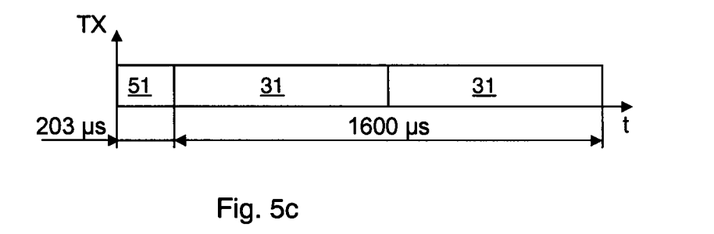
FIG. 5c shows the random-access preambles defined by 3GPP according to a third format.
Figure 5D:
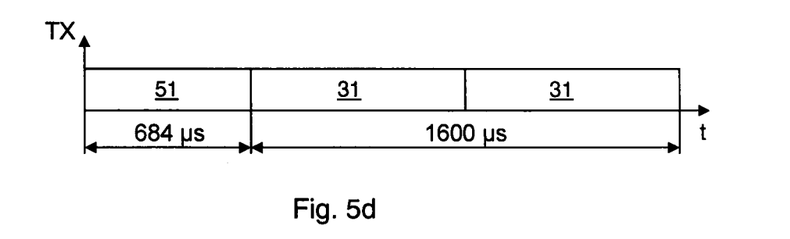
FIG. 5d shows the random-access preambles defined by 3GPP according to a fourth format.

FIG. 5b to FIG. 5d show the extended preamble formats. The format of FIG. 5b has an extended CP 51 and is suited for cell radii up to approximately 100 km. However, since no repetition occurs this format is only suited for environments with good propagation conditions. The format of FIG. 5c contains a repeated main preamble 31 and a cyclic prefix 51 of approximately 200 μs. With a RA opportunity length of 2 ms the remaining guard period is also approximately 200 μs. This format supports cell radii of up to approximately 30 km. The format of FIG. 5d also contains a repeated main preamble 31 and an extended CP 51. Using a RA opportunity length of 3 ms this format supports cell radii of up to approximately 100 km. In opposite to format of FIG. 5b the format of FIG. 5d contains a repeated preamble 31 and is therefore better suited for environments with bad propagation conditions.

The requirements on the sequence comprising the preamble are two-fold: good auto-correlation function (ACF) properties and good cross-correlation function (CCF) properties. A sequence that has ideal (periodic) ACF and CCF properties is the Zadoff-Chu sequence. The periodic ACF of Zadoff-Chu sequence is only non-zero at time-lag zero (and periodic extensions) and the magnitude of the CCF is equal to the square-root of the sequence length N. Due to special properties of Zadoff-Chu sequences the number of sequences is maximized if N is chosen prime. This together with the requirement that the effective RA bandwidth N·1250 Hz should fit into 1.05 MHz leads to N=839.

Figure 6A:
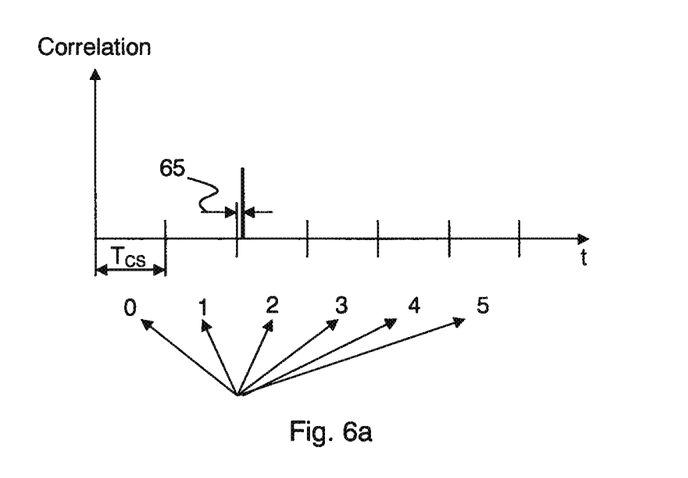
FIG. 6a shows the correlation peak when the UE is close to Node B.
Figure 6B:
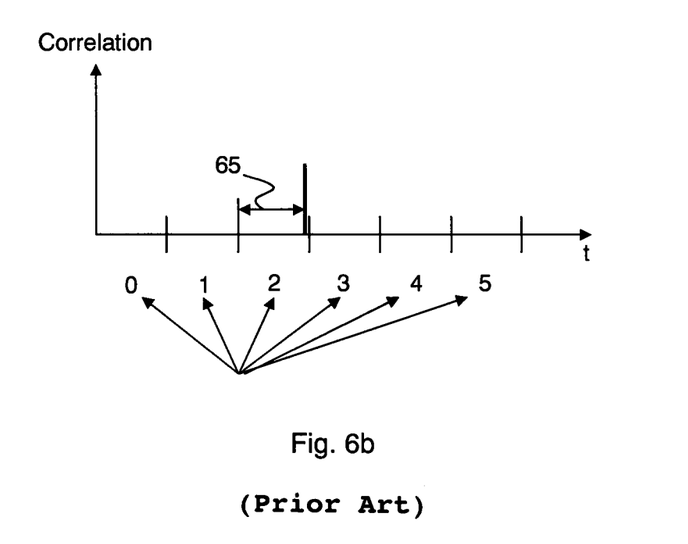
FIG. 6b shows the correlation peak when the UE is almost at the cell border.

A Zadoff-Chu sequence of length N can be expressed, in the frequency domain, as $$X_{ZC}^{(u)}(k) = e^{-j\pi u \frac{k \cdot (k+1)}{N}} \quad (1)$$

where u is the index of the Zadoff-Chu sequence within the set of Zadoff-Chu sequences of length N. Out of one Zadoff-Chu sequence—in the following also denoted root sequence—multiple preamble sequences can be derived by cyclic shifting. Due to the ideal ACF of Zadoff-Chu sequence multiple mutually orthogonal sequences can be derived from a single root sequence by cyclic shifting one root sequence multiple times the maximum allowed round trip time plus delay spread in time-domain. The correlation of such a cyclic shifted sequence and the underlying root sequence has its peak no longer at zero but at the cyclic shift. If the received signal has now a valid round trip delay—i.e. not larger than the maximum assumed round trip time—the correlation peak occurs at the cyclic shift plus the round trip delay which is still in the correct correlation zone. FIG. 6a shows the correlation peak when the UE is close to Node B and FIG. 6b shows the correlation peak when the UE is almost at the cell border. In FIGS. 6a and 6b, 65 is the time delay which indicates the round trip delay and the arrows indicates the zones 0-5 indicating transmitted sequences. For small cells up to 1.5 km radii all 64 preambles can be derived from a single root sequence and are therefore orthogonal to each other. In larger cells not all preambles can be derived from a single root sequence and multiple root sequences must be allocated to a cell. Preambles derived from different root sequences are not orthogonal to each other.

One disadvantage of Zadoff-Chu sequences is their behaviour at high frequency offsets. A frequency-offset creates an additional correlation peak in time-domain. A frequency offset has to be considered high if it becomes substantial relative to the RA sub-carrier spacing of 1250 Hz, e.g. from 400 Hz upwards. The offset of the second correlation peak relative to the main peak depends on the root sequence. An offset smaller than $T_{CS}$ may lead to wrong timing estimates, whereas values larger than $T_{CS}$ increase the false alarm rate. In order to cope with this problem LTE has a high-speed mode (or better high frequency offset mode) which disables certain cyclic shift values and root sequences so that transmitted preamble and round trip time can uniquely be identified. Additionally a special receiver combining both correlation peaks is required. For cells larger than approximately 35 km no set of 64 preambles exists that allows unique identification of transmitted preamble and estimation of propagation delay, i.e. cells larger than 35 km cannot be supported in high speed mode.

The random access preamble sequences are ordered according to a specified table. The table was designed by first separating all PRACH sequences into two groups based on the QPSK cubic metric (CM) value using a fixed 1.2 dB threshold. The sequences with low cubic metric are more suitable to assign to large cells than the sequences with high cubic metric. Within each CM-group (high and low) the sequences are further grouped according to the maximum allowed cyclic shift ($S_{max}$) at high speed.

Before a new cell can be put into service the RACH sequences needs to be configured:

The set of contention based RACH preambles used by a cell is broadcasted on the downlink BCCH. It is signalled as a first root sequence index and cyclic shift value per pre-amble range (random-high, random-low). In addition a cell needs a set of dedicated RACH preambles to be used for non-contention based RACH. Furthermore, the different root sequences have different envelope variations. Preferably a large cell, where the UEs risk being power limited on the RACH, shall be assigned a set of root sequences that have less envelope variations than a small cell.

In case high frequency offsets are anticipated then large secondary peaks can occur in the RACH sequence correlation detector. Because of this not all cyclic shifts are used in case of high speed mode.

Traditionally, manual cell planning procedures are used to assign these RACH pre-amble sequences. It is an objective of the disclosed invention to automate the procedure regarding assignment of RACH pre-amble sequences.

SUMMARY

Accordingly, one objective with the present invention is to provide an improved method and communication network node for enabling auto-tuning of preamble sequences used during random access procedures when user equipments are accessing a communication network system comprising radio base stations each serving at least one cell and with which said user equipments are communicating on uplink and downlink channels.

According to a first aspect of the present invention this objective is achieved through a method as defined in the characterising portion of claim 1, which specifies that auto-tuning of preamble sequences used during random access procedures is enabled by a method which performs the steps of: using an initial set of random access channel preamble sequences in one cell of a radio base station; collecting statistics on random access channel usage and information on identified random access channel preamble sequences potentially conflicting between neighbours of said radio base station; optimizing said set of random access channel preamble sequences using said collected statistics; and, replacing said initial set of random access channel preamble sequences with said optimized set of random access channel preamble sequences.

According to a second aspect of the present invention this objective is achieved through an arrangement as defined in the characterising portion of claim 11, which specifies that auto-tuning of preamble sequences used during random access procedures is enabled by a communication network node comprising means for using an initial set of random access channel preamble sequences in one cell of a radio base station; means for collecting statistics on random access channel usage and information on identified random access channel preamble sequences potentially conflicting between neighbours of said radio base station; means for optimizing said set of random access channel preamble sequences using said collected statistics; and, means for replacing said initial set of random access channel preamble sequences with said optimized set of random access channel preamble sequences.

Further embodiments are listed in the dependent claims.

Thanks to the provision of a method and a communication network node, which automate the procedure regarding assignment of RACH preamble sequences, an efficient optimization of RACH parameters in a multi-vendor scenario is enabled providing a simple split of functionality.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
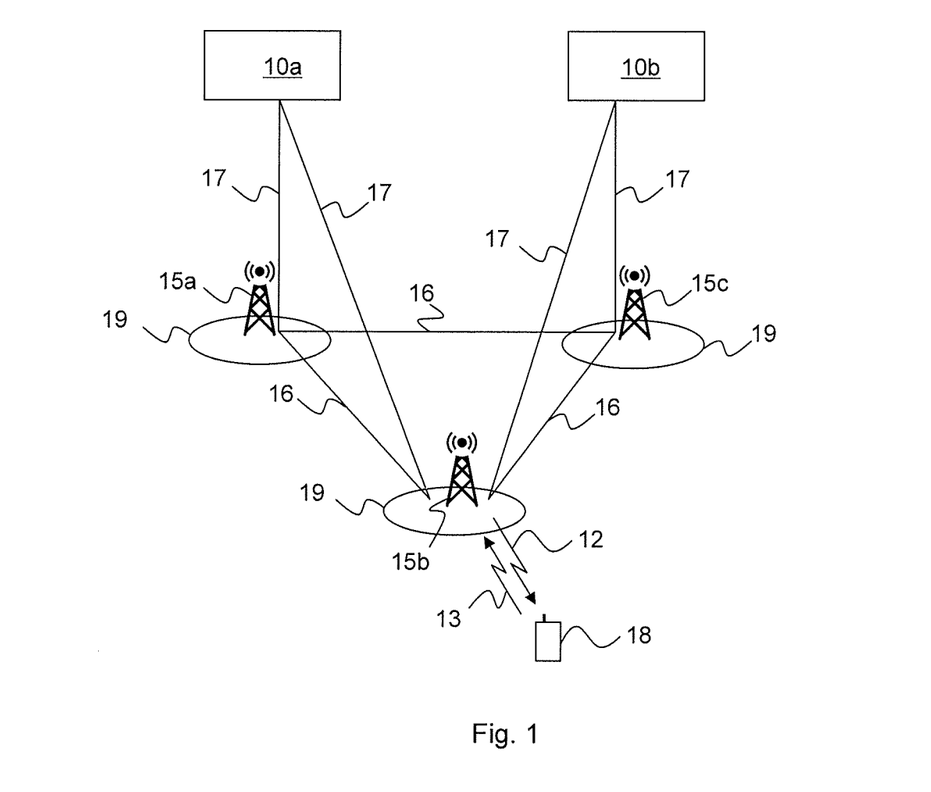
FIG. 1 shows a communication network architecture according to the present invention.

A communication system, such as a Long Term Evolution (LTE) system is shown in FIG. 1, including a Radio Access Network (RAN), comprising at least one Radio Base Station (RBS) (or eNode B) 15a, 15b and 15c. The eNode Bs are connected over an interface such as the S1-interface 17 to at least one server gateway and mobility management entity node (S-GW/MME) 10a and 10b. The S-GW/MME node handles control signalling for instance for mobility, and is connected to external networks (not shown in FIG. 1) such as the Public Switched Telephone Network (PSTN) or the Integrated Services Digital Network (ISDN), and/or a connectionless external network as the Internet.

The RAN provides communication and control for a plurality of user equipments (UE) 18 (only one shown in FIG. 1) and each RBS 15a-15c is serving at least one cell 19 through and in which the UEs 18 are moving. The RBSs 15a-15c are communicating with each other over a communication interface 16, such as X2. The UEs each uses downlink (DL) channels 12 and uplink (UL) channels 13 to communicate with at least one RBS over a radio or air interface.

According to a preferred embodiment of the present invention, the communication system is herein described as a LTE system. The skilled person, however, realizes that the inventive method and arrangement work very well on other communications systems as well. The user equipments may be mobile stations such as mobile telephones ("cellular" telephones) and laptops with mobile termination and thus can be, for example, portable, pocket, hand-held, computer-included or car-mounted mobile devices which communicate voice and/or data with the RAN.

One basic design principle behind the invention is to only coordinate the usage of RACH root sequences per frequency band on a central level, e.g. the network management system (NMS) or the operating and support system (OSS). A central entity is made responsible for ensuring that all RACH preambles used by a cell on a specific frequency band are locally unique in the vicinity of that cell. Even though it is possible for two adjacent cells to use the same RACH sequences as long as the RACH time/frequency slots to not coincide, this division enables localized optimization and adaptation of all other RACH parameters.

Another basic design principle is to avoid using cell planning tools to set the RACH preamble sequences and instead rely on measurements performed on the RACH by the eNB and/or the UEs and on neighbour cell relation information.

For RACH parameter auto-tuning it is needed to circumvent the apparent "chicken and egg" problem, i.e. that in order to perform these measurements it is first needed to assign the RACH preamble sequences. Also, in case an automatic neighbour cell relation (ANCR) algorithm is made use of to detect and configure neighbour cell relations, then it is not possible to use NCR lists to configure initial RACH parameters since initially the NCR lists of a new cell will be empty. A bootstrapping procedure is needed that ensures that a new cell is initialized with locally conflict free RACH pre-ambles and for this a central entity (located in e.g. OSS or NMS) is relied upon. Furthermore it is needed to provide a new cell with an initial set of robust RACH parameters based on over provisioning. With over provisioning in this context is meant that the initial set of RACH preamble sequences are sufficiently robust, e.g.:

Initially, a cell is assigned a large number of root sequences. Either a simple rule is used that decides the number of initial root sequences based on e.g. base station type (e.g. pico, micro, macro), or other known parameters such as output power, antenna tilt, antenna height (e.g. small, medium, large). Or it is simply decided that each new cell shall always start with the maximum number of root sequences (64).

If it is expected that there is a slightest possibility that large frequency offsets may be observed on the RACH then enabling the high speed mode may be used at the start.

E.g. a set of RACH sequences with a low cubic metric (CM) is initially selected among all possible locally non-conflicting pre-amble sequences. RACH preambles with low cubic metric should preferably be assigned to large cells and if there is little information about the size of a new cell then low CM sequences should be selected as initial RACH preamble sequences. Thus, a simple rule could be that macro cells always set the high speed mode initially while micro and pico cells do not (macro cells could get low CM sequences and micro/pico cells high CM sequences installed).

The basic principle behind the over provisioning of RACH preamble sequences is thus to start with a simple and sloppy algorithm that produces an initial set of locally conflict free RACH preamble sequences. This makes it possible to start up the new cell and to start to collect information about parameters that affects the final choice of RACH preamble sequences.

It should be obvious for anyone skilled in the art to appreciate that the disclosed algorithm for RACH parameter auto-tuning may be partitioned in many different ways that are all covered by the claims. For the purpose of explaining the details of the disclosed invention, the context of an LTE system with the architecture shown in FIG. 7 is chosen.

Figure 7:
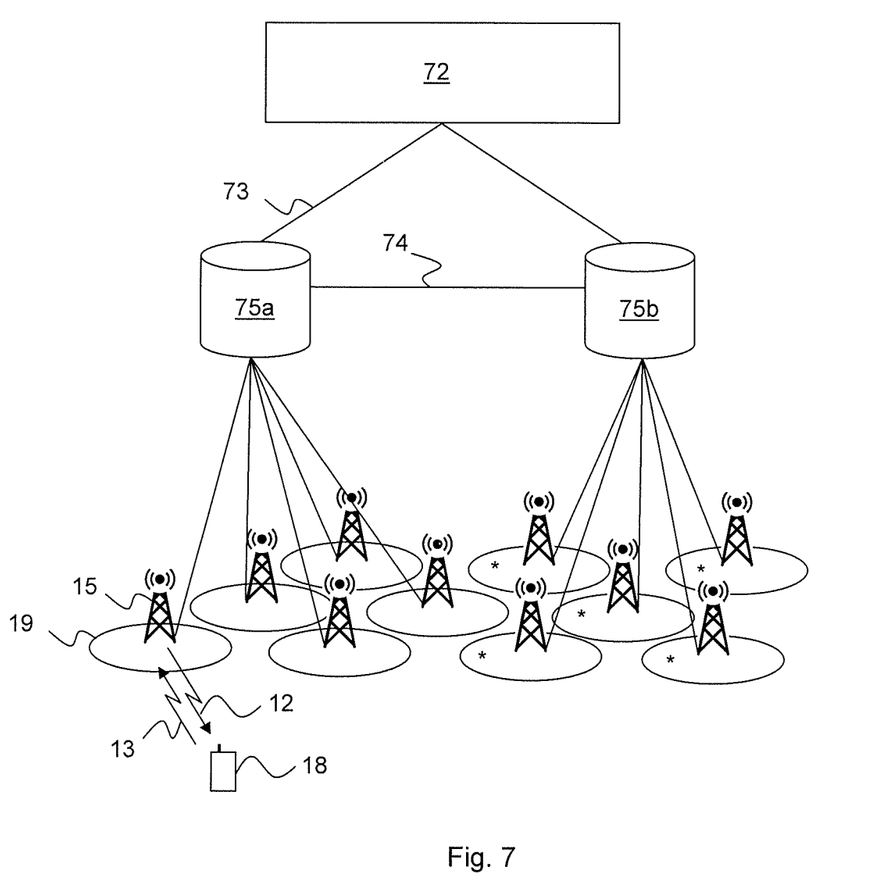
FIG. 7 is an example showing the management plane interfaces in a multi-vendor scenario.

FIG. 7 shows an example of a multi-vendor scenario where the cells 19 with an asterix, *, are provided by one vendor and the cells without asterix are provided by another vendor.

All radio base stations 15, such as eNB, from a particular vendor are connected to an associated operation and support system (OSS) 75a and 75b respectively. The OSS nodes 75a and 75b are connected via an open interface, Itf-N, 73 to a network management system (NMS) node 72. And, the OSSs 75a and 75b are connected to each other via an open interface, Itf-p2p, 74. For clarity reason only one cell 19 and one RBS 15 are denoted in FIG. 7. Each RBS 15 is communicating with one or more UEs 18 on uplink 13 and downlink 12 channels. Also for clarity reasons, only one UE is illustrated in FIG. 7.

With the architecture shown in FIG. 7 it is possible to begin to partition the disclosed RACH parameter auto-tuning method into processes or entities that are located in the different nodes and also define how these processes or entities communicate with each other, and more precisely what these different process or entities are supposed to do.

Thus, in one embodiment the NMS 72 handles the coordination of RACH boot strapping root-sequences using coarse geographical location, e.g. region, and information about the cell (macro/micro/pico). The OSSs 75a and 75b handle the coordination of RACH root sequences using NCR information.

As an overall comment to FIG. 7 is recalled that the partitioning of the problem into handling of locally non-conflicting RACH root sequences on a high layer (NMS 72 or OSS 75) enables localized optimization of many other RACH parameters in lower layers (OSS 75 or eNB 15). Obviously UE and eNB measurements must be performed in the UEs and in the eNBs respectively, but everything that in FIG. 7 is performed in the OSS nodes 75a and 75b could in principle be performed either in the eNBs or on the NMS level.

The UEs 18 may observe the following:
Contention: i.e. the probability that two UEs address the same pre-amble at the same time. The eNB can not detect such RACH collisions but the UE can, based on the contention resolution message (message 4 in FIG. 2). In case UE report different probability of contention on different RACH pre-ambles this might be an indication that some of the RACH pre-ambles are conflicting with RACH pre-ambles used in other cells.
Doppler: The Doppler shift observed by the UEs could provide input to an algorithm that decides if RACH high speed mode shall be used or not. Note however that the eNB are also capable of determining the Doppler shift of the received signals from the UEs.

In the eNB e.g. the following is observed:
Neighbouring cells: If an automatic neighbour cell relation (ANCR) algorithm is used then initially the neighbour cell relation list of the new cell is typically empty. Eventually the ACNR will find all neighbouring cells and it is possible to check what RACH preamble sequences that are used in neighbouring cells and avoid selecting these in the final preamble selection of the new cell.
Delay of received RACH pre-ambles: The distribution of received RACH delays can be used to determine the minimum required cyclic shift.
Doppler estimation: Based on the location of the secondary peak in the RACH correlation detector the eNB can estimate the Doppler of the UEs. This information can be used to determine if the RACH high speed mode needs to be used or not.

After having observed the statistics on the RACH channel usage a localized optimization of the parameters affecting the final selection of RACH preamble sequences is performed. For example since RACH pre-amble sequences derived from the same root sequence are orthogonal while RACH pre-amble sequences derived from different root sequences are non-orthogonal, there is an incentive to use as few root sequences as possible in each cell. No central coordination is required to reduce the number of root sequences used in a cell if the initial set of root sequences is locally conflict free and the optimized set of root sequences is a sub-set of the initial set. Thus it may be delegated to the OSS or to the eNB to decide how many root sequences that are needed in a cell based on measurements only from that particular cell. It is however important that root sequences that become unused in a cell after optimization are given back to the central coordinating entity so that they may be used in other cells.

The selection of which root sequences that shall be used to derive the 64 RACH preamble sequences consists of the following steps:
Step 1: Determine if the high speed RACH flag needs to be set or not. The high speed RACH flag needs to be set in case the UEs in the cell often experience high Doppler shifts. Thus, if the probability that a random UE in the cell experiences a Doppler shift larger than a first threshold $\gamma_{Doppler}$ is larger than a second threshold $\gamma_{probability}$, then the cell need to set the high-speed RACH flag. Otherwise the cell should not set the high-speed RACH flag.
Step 2: Determining of the required cyclic shift $N_{CS}$ in the cell. This is typically done by observing the probability distribution of the observed delays of all RACH attempts from all UEs. Preferably the eNB should only count received correlation peaks that resulted in UEs successfully completing a random access. The delay statistics of the received RACH preambles is considered stable after a certain time or when a certain number of RACH attempts have been observed. Then the required cyclic shift $N_{CS}$ can be selected as the smallest possible value such that X % (where a typical value of X could be e.g. 99.9) of the observed delays is smaller than $N_{CS}$.
Step 3: Determination of the final RACH preamble sequences. This step can be implemented in different ways with different degrees of optimization:
Step 3a: The eNB may select a sub-set of the initial RACH preamble sequences. Typically the first root sequence is used to derive as many RACH pre-amble sequences as possible while assuring that each correlation zone is at least of size NCS and, in case the high speed flag was set, that the maximum correlation zone is not larger than the maximum high speed value of each particular root sequence. Any eventual root sequences that are left over after such a local optimization in the eNB should be returned back to the central coordination unit in the OSS or in the NMS.

Step 3b: Once a new cell is operational and it has established relations to neighbouring cells it is possible for a localized algorithm (located in e.g. the OSS or the eNB) to find a new set of locally non-conflicting root sequences that are not necessarily a sub-set of the initial set of root sequences. Either a cell asks its neighbour cells about which root sequences they use on a given frequency band using the X2 or the S1 interfaces. Additionally, a cell may ask all neighbouring cell about all RACH root sequences that any of their neighbouring cells currently uses. This procedure would require standardization of messages for communicating information about RACH root sequence usage over the X2 and S1 interfaces. Also, once a cell changes root sequences an update notification message is required. Probably a lock message is also required to ensure that several cells do not change root sequences at the same time.

Step 3c: Another alternative is that root sequence change is coordinated by the OSS or the NMS. In this scenario it is necessary to standardized messages over the Itf-N or the Itf-p2p interfaces to communicate information about root sequence usage in a nearby cell that is connected to another OSS. The central RACH preamble sequence coordination unit (i.e. the OSS or the NMS) selects the set of RACH preamble sequences to use in the new cell. In such a case a large cell that has reported that it needs a large cyclic shift NCS can be assigned to root sequences that have a low cubic metric. Cells that have reported that the high speed flag needs to be set can be assigned root sequences supporting a large maximum cyclic shift in high speed operation. This step may involve observing that the most appropriate RACH sequences for the new cell is actually already in use by another neighbouring cell and that these RACH preamble sequences first must be made available by a reallocating procedure.

In a preferred embodiment, a first OSS is responsible for allocating locally conflict-free root sequences based on neighbour cell lists, root sequence and coarse geographical information from a managed eNodeB, and on corresponding information about eNodeBs managed by a second OSS. The information from a second OSS is shared via an open interface upon request from the first OSS. Either, the information is explicit as the set of used root sequences from a particular eNodeB, or aggregated as the set of root sequences used by any eNodeB in a set, or within a given distance from a given location. The information may be associated with a validity time, within which the information can be expected to be static.

In another embodiment the NMS is responsible for allocating an initial set of root sequences that are guaranteed to be locally conflict free and that this initial set of root sequences is selected by the NMS without making use of NCR list information. A set of boot-strapping sequences may be defined on a central level (e.g. NMS). These sequences are then only used to initiate a new base station and are then released and replaced by another set of sequences after localized optimization. Messages for requesting and releasing boot strapping pre-amble sequences must then be standardized (e.g. between the NMS and the OSS nodes).

In another embodiment, each eNodeB is associated to a coarse geographical region, either directly, or implicitly via its tracking area, which in turn is associated to a coarse geographical region. When a new eNodeB is deployed, it is associated to a first geographical region and a first OSS from which it will be managed. If this first geographical region includes eNodeBs that are connected to a second OSS, or if the first geographical region is adjacent to a second geographical region, which includes eNodeBs that are connected to a second OSS, then the initial set of root sequences of the new eNodeB needs to be coordinated by NMS. In this case, NMS either informs the first OSS about a set of root sequences the first OSS is allowed to select from (white listing) when initiating the new eNodeB, or a set of root sequences the first OSS is not allowed to select from (black listing). If there are no expected relations between the new eNodeB to be deployed, and eNodeBs in the second OSS, then the first OSS can allocate root sequences to the new eNodeB without restrictions from NMS.

When changing the root sequence allocation of an eNodeB, OSS informs NMS about the change. Changes, which mean that the number of root sequences allocated to a particular eNodeB are decreased can be made without permission from NMS. Changes, which involves previously not used root sequences needs to be authorized by NMS. NMS can also inform OSS about what eNodeBs OSS is free to manage without NMS coordination, and what eNodeBs OSS needs NMS coordination when managing.

Figure 8:
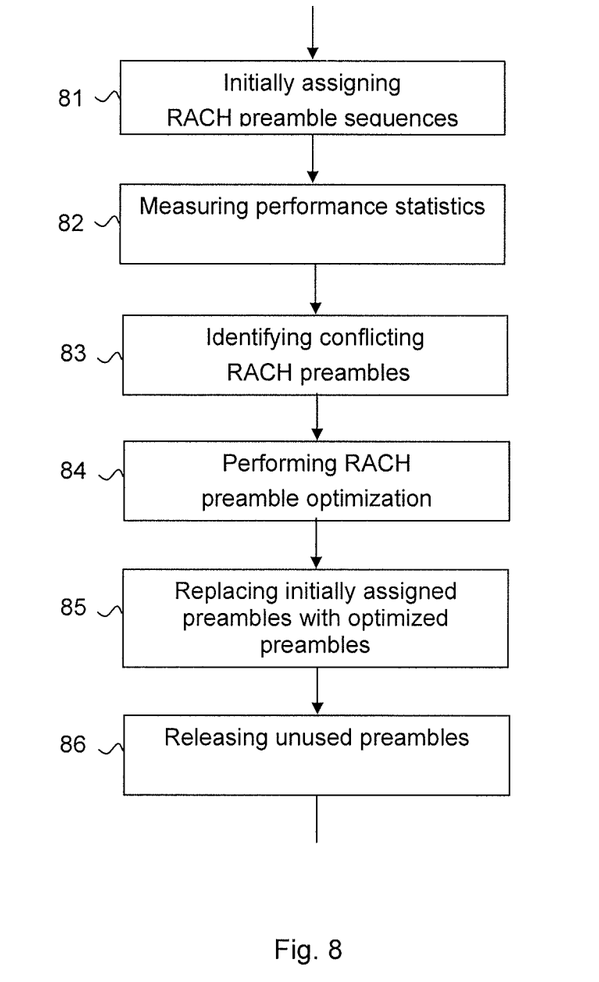
FIG. 8 is a flowchart illustrating the inventive method.

According to a preferred embodiment of the present invention the procedure for enabling auto-tuning of preamble sequences used during random access procedures when user equipments are accessing a communication network system comprising radio base stations each serving at least one cell and with which said user equipments are communicating on uplink and downlink channels, whereby said random access procedure is started when said user equipments send a random access preamble derived from a root sequence to said radio base stations, shown in FIG. 8, is as follows:

using an initial set of random access channel (RACH) preamble sequences when said random access procedure is started (step 81) in one cell of a radio base station. The used initial set is assigned to said radio base station from a first communication network entity;

measuring/collecting statistics on a random access channel (RACH) usage using said assigned initial random access channel (RACH) preamble sequences (step 82);

identifying potentially conflicting random access channel preamble sequences between neighbours to said base station in said communication network system (step 83);

optimizing said set of random access channel (RACH) preamble sequences using said measured statistics on random access channel (RACH) usage and said information on identified random access channel preamble sequences potentially conflicting between neighbours of said radio base stations (step 84);

replacing said assigned initial set of preamble sequences with said optimized set of preamble sequences (step 85);

optionally, releasing said set of initially assigned random access channel (RACH) preamble sequences (step 86).

Figure 9:
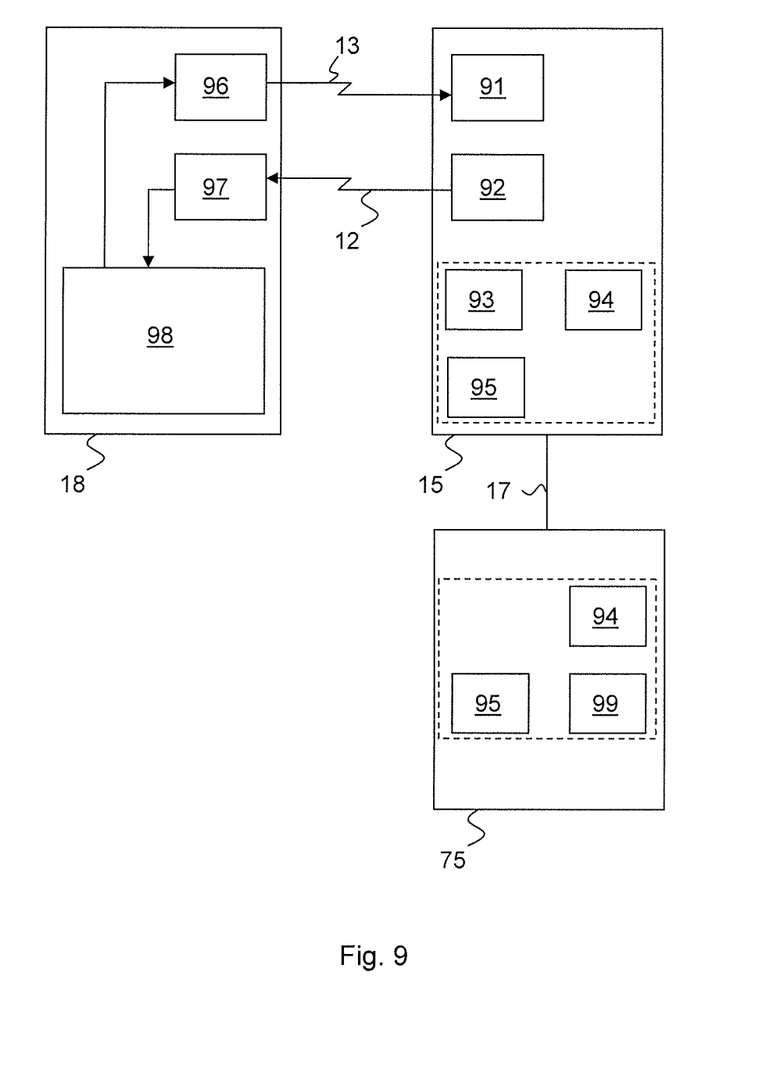
FIG. 9 is a simplified block diagram of an inventive user equipment and radio base station.

FIG. 9 is a block diagram showing a user equipment 18, a radio base station (RBS) 15, such as eNode B, and an operating and support system (OSS) 75 for enabling auto-tuning of parameters used during random access procedures when user equipments are accessing in a communication network system comprising radio base stations each serving at least one cell and with which said user equipments are communicating on uplink 13 and downlink 12 channels.

The RBS 15 comprises a radio transmitter 92 and a receiver 91. The transmitter 92 is transmitting data to a receiver 97 of the user equipment 18 over a radio interface on the downlink channel 12. The receiver 91 is receiving data from the user equipment 18 on the uplink channel 13. The RBS 15 further comprises means 93 for using an initial set of random access channel (RACH) preamble sequences in one cell of a RBS 15, which initial set has been assigned to the RBS 15 from a first communication network entity (shown as 99 in the OSS 75) arranged to maintain a set of random access channel preamble sequences that are known to be non-conflicting for pre-determined geographical regions and frequency bands. The RBS 15 further comprises means 93 for collecting statistics on random access channel usage and information on identified random access channel preamble sequences potentially conflicting between neighbours of said radio base station.

The RBS 15 further comprises a second communication network entity 94 arranged to optimize said set of random access channel (RACH) preamble sequences using measured/collected statistics on random access channel (RACH) usage and information on identified random access channel preamble sequences potentially conflicting between neighbours of said radio base stations. Additionally, the RBS 15 comprises means 95 for replacing said initial set of random access channel preamble sequences with said optimized set of random access channel preamble sequences.

The user equipment 18 comprises a radio transmitter 96 arranged to transmit data packets to the receiver 91 of the RBS 15 over the radio interface on the uplink channel 13 and a receiver 97 arranged to receive data packets transmitted from the transmitter 92 of the RBS 15 on the downlink channel 12. The transmitter 96 is further arranged to send a random access preamble to the RBS 15 to start said random access procedure. The user equipment further comprises means 98 for collecting and reporting to the eNB performance measurements on RACH usage as well as Doppler. Thus, the UE 18 is arranged to observe Doppler shift providing an indication of if a random access channel high speed mode should be used or not and to detect contention indicating that conflicting random access channel preamble sequences are used.

The OSS 75 is communicating with the RBS 15 via the interface 17 and optionally comprises a first communication network entity 99 arranged to use an initial set of random access channel (RACH) preamble sequences when said random access procedure is started by assigning to the RBS 15 the initial set. The first communication network node 99 is further arranged to maintain a set of random access channel preamble sequences that are known to be non-conflicting for pre-determined geographical regions and frequency bands. Said first communication network node 99 further is used for collecting statistics on random access channel usage and information on identified random access channel preamble sequences potentially conflicting between neighbours of said radio base station.

The OSS 75 further comprises a second communication network entity 94 arranged to optimize said set of random access channel (RACH) preamble sequences using measured/collected statistics on random access channel (RACH) usage and information on identified random access channel preamble sequences potentially conflicting between neighbours of said radio base stations. Additionally, the OSS 75 comprises means 95 for replacing said initial set of random access channel preamble sequences with said optimized set of random access channel preamble sequences.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of enabling auto-tuning of preamble sequences used during random access procedures, comprising:
   using an initial set of random access channel preamble sequences in one cell of a radio base station;
   identifying potentially conflicting random access channel preamble sequences between neighbours of said radio base station;
   collecting statistics on random access channel usage and information on the identified random access channel preamble sequences potentially conflicting between neighbours of said radio base station;
   optimizing said set of random access channel preamble sequences using said collected statistics; and
   replacing said initial set of random access channel preamble sequences with said optimized set of random access channel preamble (RACP) sequences, wherein
   the initial set of RACP sequences includes at least one RACP sequence that is not included in the optimized set of RACP sequences and said radio base station is configured such that only the optimized set of random access channel preamble sequences is used in said cell as a result of the replacing step being performed.

2. The method of claim 1, wherein the method further comprises the step of basing said initial usage of random access channel preamble sequences on the size or type of said at least one cell.

3. The method of claim 1, wherein the method further comprises the step of observing a Doppler shift providing an indication of whether a random access channel high speed mode should be used or not.

4. The method of claim 1, further comprising determining that one or more preambles included in the initial set of preambles are conflicting with preambles used in other cells.

5. The method of claim 1, wherein the method further comprises at least one of the following steps:
   using an automatic neighbour cell relation algorithm to avoid selecting random access channel preamble sequences used in neighbouring cells;
   measuring a delay of received random access channel preambles which is used to determine a minimum required cyclic shift; and
   measuring a Doppler shift value on a received signal from a number of user equipments providing an indication of if a random access channel high speed mode should be used or not.

6. The method of claim 1, wherein the method further comprises the step of maintaining in a first communication network entity a set of random access channel preamble sequences that are known to be non-conflicting for pre-determined geographical regions and frequency bands.

7. The method of claim 1, wherein said step of optimizing said random access channel preamble sequences is performed by a second communication network entity.

8. The method of claim 7, wherein said first communication network entity is responsible for selecting said initial set of random access channel preamble sequences.

9. The method of claim 1, wherein the method further comprises the step of receiving in a first communication network entity information on said optimized set of random access channel preamble sequences when said used initial set of parameters random access channel preamble sequences has been replaced with said optimized set of random access channel preamble sequences.

10. The method of claim 1, wherein the method further comprises the steps of:
    defining a set of boot-strapping preamble sequences;
    using said defined set of boot-strapping preamble sequences to initiate a new radio base station;
    optimizing said defined set of boot-strapping preamble sequences; and
    replacing said defined set of boot-strapping preamble sequences with said optimized set of boot-strapping preamble sequences.

11. A radio base station for enabling auto-tuning of preamble sequences used during random access procedures, wherein the radio base station is configured to:
    use an initial set of random access channel preamble sequences in one cell of a radio base station;
    collect statistics on random access channel usage and information on identified random access channel preamble sequences potentially conflicting between neighbours of said radio base station;
    optimize said set of random access channel preamble sequences using said collected statistics;
    replace said initial set of random access channel preamble sequences with said optimized set of random access channel preamble (RACP) sequences, wherein
    the initial set of RACP sequences includes at least one RACP sequence that is not included in the optimized set of RACP sequences and the radio base station is configured such that only the optimized set of random access channel preamble sequences is used in said cell as a result of the replacing step being performed.

12. The radio base station according to claim 11, wherein the radio base station is further configured to base said initial usage of random access channel preamble sequences on the size or type of said at least one cell.

13. The radio base station according to claim 11, when said measured statistics is measured by said user equipments, wherein the user equipment is arranged to observe Doppler shift providing an indication of if a random access channel high speed mode should be used or not.

14. The radio base station according to claim 11, when said potentially conflicting random access channel preamble sequences is identified by said user equipments, wherein the user equipment is arranged to detect contention indicating that conflicting random access channel preamble sequences are used.

15. The radio base station according to claim 11, when said measured statistics is measured by said radio base station, wherein the radio base station is arranged to perform at least one of the following steps:
    using an automatic neighbour cell relation algorithm to avoid selecting random access channel preamble sequences used in neighbouring cells;
    measuring a number of delayed random access channel preambles which is used to determine a minimum required cyclic shift; and
    measuring a Doppler shift value between two user equipments providing an indication of if a random access channel high speed mode should be used or not.

16. The radio base station according to claim 11, wherein the radio base station comprises a first communication network entity arranged to maintain a set of random access channel preamble sequences that are known to be non-conflicting for pre-determined geographical regions and frequency bands.

17. The radio base station according to claim 11, wherein said radio base station comprises a second communication network entity for optimizing said random access channel preamble sequences.

18. The radio base station according to claim 16, wherein said first communication network entity is arranged to select said initial set of random access channel preamble sequences.

19. The radio base station according to claim 16, wherein said first communication network entity is arranged to receive information on said optimized set of random access channel preamble sequences when said used initial set of parameters random access channel preamble sequences has been replaced with said optimized set of random access channel preamble sequences.

20. The radio base station according to claim 11, wherein the radio base station is further configured to:
- define a set of boot-strapping preamble sequences;
- use said defined set of boot-strapping preamble sequences to initiate a new radio base station;
- optimize said defined set of boot-strapping preamble sequences; and
- replace said defined set of boot-strapping preamble sequences with said optimized set of boot-strapping preamble sequences.

21. The method of claim 1, wherein the step of optimizing the set of random access channel preamble sequences comprise selecting, from the initial set of preamble sequences, a plurality of random access channel preamble sequences, thereby forming a sub-set of random access channel preamble sequences, wherein the sub-set of random access channel preamble sequences includes fewer preamble sequences than the initial set.

22. A method of enabling auto-tuning of preamble sequences used during random access procedures, comprising:
- assigning to a cell of a radio base station an initial set of root sequences comprising two or more root sequences;
- determining information pertaining one or more cells neighboring said cell of said radio base station;
- using said determined information to produce an optimized set of root sequences, the optimized set of root sequences being a subset of the initial set of root sequences such that the optimized set of root sequences includes fewer root sequences than said initial set; and
- the radio base station using for random accesses in said cell only the root sequences included in said optimized set of root sequences.

23. The method of claim 22, wherein the step of determining information comprises determining what RACH preambles are used by one of said one or more neighboring cells.

24. The method of claim 22, wherein each of said root sequences is a Zadoff-Chu sequence.

* * * * *

UNITED STATES PATENT AND TRADEMARK OFFICE
CERTIFICATE OF CORRECTION

PATENT NO. : 8,824,306 B2  
APPLICATION NO. : 13/002096  
DATED : September 2, 2014  
INVENTOR(S) : Frenger et al.

Page 1 of 1

It is certified that error appears in the above-identified patent and that said Letters Patent is hereby corrected as shown below:

On the Title Page, in item (75), under "Inventors", in Column 1, Line 1, delete "Pal Frenger, Linkoping" and insert -- Pål Frenger, Linköping --, therefor.

On the Title Page, in item (75), under "Inventors", in Column 1, Line 2, delete "Linkoping" and insert -- Linköping --, therefor.

On the Title Page, in item (56), under "OTHER PUBLICATIONS", in Column 2, Line 1, delete "Apn. No." and insert -- Appn. No.: --, therefor.

In the Specification

In Column 4, Line 60, delete "receiver)," and insert -- receiver) --, therefor.

Signed and Sealed this  
Eighteenth Day of August, 2015

Michelle K. Lee  
*Director of the United States Patent and Trademark Office*